US010664579B2

(12) United States Patent
Dixon et al.

(10) Patent No.: US 10,664,579 B2
(45) Date of Patent: May 26, 2020

(54) PROGRAMMABLE RHYTHM DETECTION LOCKING SYSTEM AND METHOD THEREOF

(71) Applicant: Haptic One, Inc., Austin, TX (US)

(72) Inventors: Benjamin Robert Dixon, Austin, TX (US); William Jeffrey Sylvester, Austin, TX (US); Jonathan C. Wooding, San Antonio, TX (US)

(73) Assignee: Haptic One, Inc., Austin, TX (US)

( * ) Notice: Subject to any disclaimer, the term of this patent is extended or adjusted under 35 U.S.C. 154(b) by 173 days.

(21) Appl. No.: 15/976,424

(22) Filed: May 10, 2018

(65) Prior Publication Data

US 2018/0330067 A1 Nov. 15, 2018

Related U.S. Application Data

(60) Provisional application No. 62/504,257, filed on May 10, 2017.

(51) Int. Cl.
*G06F 21/32* (2013.01)
*G06K 9/62* (2006.01)
(Continued)

(52) U.S. Cl.
CPC .............. *G06F 21/32* (2013.01); *G06F 3/017* (2013.01); *G06F 21/316* (2013.01);
(Continued)

(58) Field of Classification Search
CPC .......... G06F 21/32; G06F 3/0219; G06K 9/62
See application file for complete search history.

(56) References Cited

U.S. PATENT DOCUMENTS 4,197,524 A * 4/1980 Salem ................ G07C 9/00658 340/5.51
8,125,312 B2 * 2/2012 Orr ........................ G08C 19/00 340/5.3

(Continued)

OTHER PUBLICATIONS

Chen et al, Improved Query-By-Tapping Via Tempo Alignment,15th International Society for Music Information Retrieval Conference (ISMIR 2014), pp. 289-294, Taiwan.

(Continued)

*Primary Examiner* — Hee K Song
(74) *Attorney, Agent, or Firm* — William G. Heedy; The Van Winkle Law Firm

(57) ABSTRACT

Detecting rhythm for selectively controlling access via a programmable locking system includes the steps of detecting a plurality of primary taps made by a user; storing the time intervals as a primary input sequence; normalizing the primary input sequence; calculating a tolerance value; detecting a plurality of secondary taps made by a user; storing the time intervals as a secondary input sequence; normalizing the secondary input sequence; storing a plurality of difference values equal to the value of the differences between the corresponding time intervals of the normalized primary and secondary input sequences; generating a secondary input sequence range equal to the value of the range between the minimum and maximum values of the difference values; and providing access via the programmable locking system when the value of the secondary input sequence range is lower than the tolerance value of the primary input vibration sequence.

4 Claims, 1 Drawing Sheet

(51) Int. Cl.

| | |
|---|---|
| ***G06F 3/01*** | (2006.01) |
| ***G06K 9/00*** | (2006.01) |
| ***G06F 21/31*** | (2013.01) |
| *G06F 3/02* | (2006.01) |

(52) U.S. Cl.

CPC ........... *G06K 9/00496* (2013.01); *G06K 9/62* (2013.01); *G06F 3/0219* (2013.01)

(56) References Cited

U.S. PATENT DOCUMENTS

| | | | | |
|---|---|---|---|---|
| 8,570,294 | B2 * | 10/2013 | Adamson | G06F 3/04883<br>345/173 |
| 9,447,609 | B2 * | 9/2016 | Johnson | E05B 47/0012 |
| 9,695,616 | B2 * | 7/2017 | Johnson | E05B 47/0012 |
| 10,241,564 | B2 * | 3/2019 | Nakagawa | G06F 1/163 |
| 2014/0285320 | A1 * | 9/2014 | Blackmer | B60R 25/23<br>340/5.72 |
| 2015/0242036 | A1 | 8/2015 | Heidari et al. | |
| 2017/0357791 | A1 * | 12/2017 | Einberg | G06F 21/32 |

OTHER PUBLICATIONS

Hanna and Robine, Query by Tapping System Based on Alignment Algorithm, ICASSP 2009, pp. 1881-1884, France.

Hoefer, Secret Knock Activated Drawer Lock, Oct. 17, 2016, pp. 1-16, Adafruit Industries.

Naudi et al, Knock to Unlock, International Journal of Emerging Research in Management & Technology, Sep. 2015, pp. 92-100, vol. 4, Issue-9, IJERMT, India.

* cited by examiner

PROGRAMMABLE RHYTHM DETECTION LOCKING SYSTEM AND METHOD THEREOF

RELATED APPLICATION

This application claims priority to and incorporates entirely by reference U.S. Provisional Patent Application Ser. No. 62/504,257 filed on May 10, 2017.

BACKGROUND OF THE INVENTION

The present invention relates to a programmable system for detecting rhythm based sequences and allowing or prohibiting access to a locked element in communication with the programmable system by matching rhythmic similarity in accordance with a preprogrammed input tap sequence.

DISCUSSION OF THE RELATED ART

Generally, an electronic lock is a locking device for controlling access to an enclosure which operates by means of electric current. At the present time, the most commonly utilized electronic lock is a keypad wherein a numerical code is entered for purposes of authentication and/or access. More recently, biometrics (e.g., fingerprint and retinal scanning) and radio-frequency identification have become more widely accepted.

Another form of electronic lock detects a series of taps on a surface, converts the taps into a series of electrical signals, processes the signals and compares the tap sequence with a preset code. Examples of such electronic locks which employ this basic concept of detecting and processing tap sequences are disclosed in U.S. Pat. No. 4,197,524 to Salem, U.S. Pat. No. 8,125,312 to Orr, U.S. Pat. No. 8,570,294 to Adamson et al., and U.S. Pat. No. 9,447,609 to Johnson et al.

While each of the above referenced forms of electronic lock systems are useful for their intended purposes, there exists a need in the art for a system that may be programmed for detecting rhythm based sequences and allowing or prohibiting access to a locked element in communication with the system by matching rhythmic similarity in accordance with a preprogrammed algorithm.

SUMMARY OF THE INVENTION

In accordance with one form of the invention, there is provided a method for detecting rhythm for selectively controlling access via a programmable locking system, the method including the steps of detecting a plurality of primary taps made by a user; generating and storing the time intervals between each of the plurality of primary taps as a primary input sequence; normalizing the primary input sequence; calculating a tolerance value of the primary input sequence; detecting a plurality of secondary taps made by a user; generating and storing the time intervals between each of the detected plurality of secondary taps as a secondary input sequence; normalizing the secondary input sequence; generating and storing a plurality of difference values, wherein the plurality of difference values is equal to the value of the differences between the corresponding time intervals of the normalized primary and secondary input sequences; generating and storing a secondary input sequence range, wherein the secondary input sequence range is equal to the value of the range between the minimum and maximum values of the stored plurality of difference values; comparing the tolerance value of the primary input vibration sequence to the value of the secondary input sequence range; and providing access via the programmable locking system when the value of the secondary input sequence range is lower than the tolerance value of the primary input vibration sequence.

In accordance with another form of the invention, there is provided a programmable locking device for detecting rhythm for selectively controlling access to an enclosure, the programmable locking device including a sensor for detecting a plurality of primary taps made by a user, a system in communication with the sensor being structured and disposed for generating and storing the time intervals between each of the plurality of primary taps as a primary input sequence, and normalizing the primary input sequence; calculating a tolerance value of the primary input sequence; the sensor being structured and disposed for further detecting a plurality of secondary taps made by a user; the system being further structured and disposed for generating and storing the time intervals between each of the detected plurality of secondary taps as a secondary input sequence, normalizing the secondary input sequence, generating and storing a plurality of difference values, wherein the plurality of difference values is equal to the value of the differences between the corresponding time intervals of the normalized primary and secondary input sequences, generating and storing a secondary input sequence range, wherein the secondary input sequence range is equal to the value of the range between the minimum and maximum values of the stored plurality of difference values, and comparing the tolerance value of the primary input vibration sequence to the value of the secondary input sequence range; and wherein access to the enclosure via the system is provided when the value of the secondary input sequence range is lower than the tolerance value of the primary input vibration sequence.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the method for detecting rhythm for selectively controlling access via a programmable locking system of the present invention is shown and generally indicated as 10.

Figure 1:
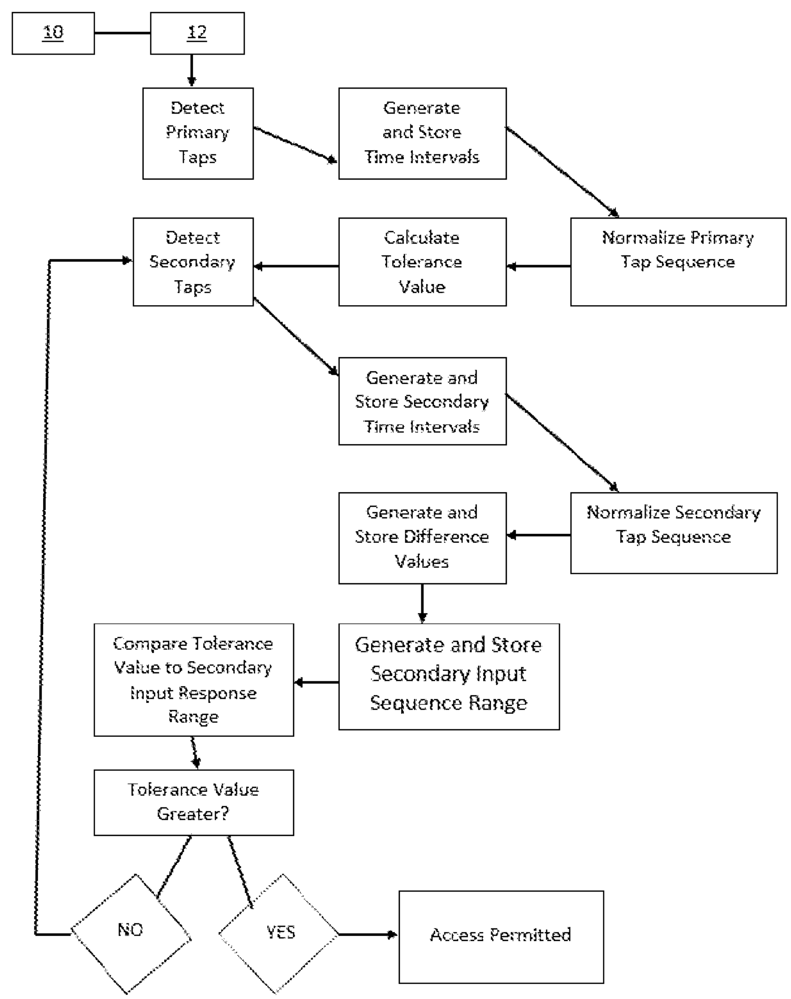
FIG. 1 illustrates a block diagram of the steps for detecting rhythm for selectively controlling access via a programmable locking system.

Referring initially to FIG. 1, the method for detecting rhythm for selectively controlling access via a programmable locking system 10 includes the steps of detecting a plurality of primary taps made by a user; generating and storing the time intervals between each of the plurality of primary taps as a primary input sequence; normalizing the primary input sequence; calculating a tolerance value of the primary input sequence; detecting a plurality of secondary taps made by a user; generating and storing the time intervals between each of the detected plurality of secondary taps as a secondary input sequence; normalizing the secondary input sequence; generating and storing a plurality of difference values, wherein the plurality of difference values is equal to the value of the differences between the corresponding time intervals of the normalized primary and secondary input sequences; generating and storing a secondary input sequence range, wherein the secondary input sequence range is equal to the value of the range between the minimum and maximum values of the stored plurality of difference values; comparing the tolerance value of the primary input vibration sequence to the value of the secondary input sequence range; and providing access via the programmable locking system when the value of the secondary input sequence range is lower than the tolerance value of the primary input vibration sequence.

Referring still to FIG. 1, the programmable locking device 10 for detecting rhythm for selectively controlling access to an enclosure includes a sensor 12 for detecting a plurality of primary taps made by a user, a system in communication with the sensor being structured and disposed for generating and storing the time intervals between each of the plurality of primary taps as a primary input sequence, and normalizing the primary input sequence; calculating a tolerance value of the primary input sequence; the sensor 12 being structured and disposed for further detecting a plurality of secondary taps made by a user; the system being further structured and disposed for generating and storing the time intervals between each of the detected plurality of secondary taps as a secondary input sequence, normalizing the secondary input sequence, generating and storing a plurality of difference values, wherein the plurality of difference values is equal to the value of the differences between the corresponding time intervals of the normalized primary and secondary input sequences, generating and storing a secondary input sequence range, wherein the secondary input sequence range is equal to the value of the range between the minimum and maximum values of the stored plurality of difference values, and comparing the tolerance value of the primary input vibration sequence to the value of the secondary input sequence range; and wherein access to the enclosure via the system is provided when the value of the secondary input sequence range is lower than the tolerance value of the primary input vibration sequence.

Other embodiments of the programmable locking device 10 utilize a system in communication with a third-party sensing device, such as a smartphone device, for detecting the plurality of primary and secondary taps.

Example

The present invention is further illustrated by the example below. The example is only to illustrate the invention and should not be interpreted as limiting the scope of the invention since further modifications of the disclosed invention may be apparent to those skilled in the art. All such modifications are deemed to be within the scope of the claimed invention.

Figure 2:
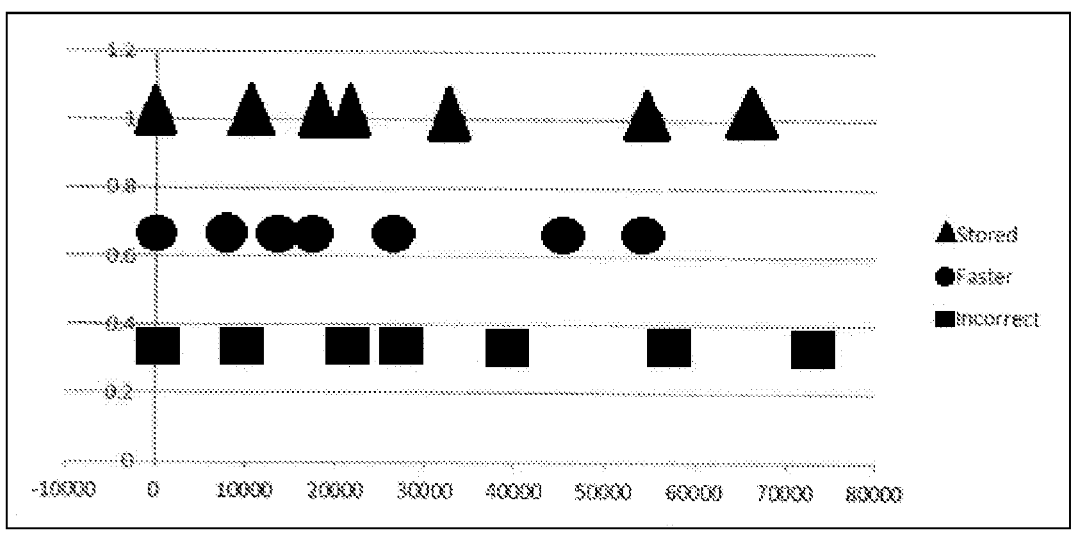
FIG. 2 illustrates a time series plot of three tap sequences.

Referring to FIG. 2, the system 10 is first initialized with the user programming the primary input sequence, “Stored”. In this example, two separate secondary input sequences, “Faster” and “Incorrect” are analyzed in view of the primary input sequence, “Stored.” Below is a chart providing the correlating numerical data for the primary input sequence and each of the secondary input sequences:

| Stored | Faster | Incorrect |
|---|---|---|
| 0 | 0 | 0 |
| 10555 | 7692 | 9560 |
| 18138 | 13735 | 21429 |
| 21435 | 17305 | 27429 |
| 32645 | 26370 | 39296 |
| 54727 | 45324 | 57094 |
| 65602 | 54115 | 72914 |

Importantly, as noted above, it is the time intervals between each tap which the system analyzes. The following chart provides the time interval data between each of the seven taps:

| Stored | Faster | Incorrect |
|---|---|---|
| 10555 | 7692 | 9560 |
| 7583 | 6043 | 11869 |
| 3297 | 3570 | 6000 |
| 11210 | 9065 | 11867 |
| 22082 | 18954 | 17798 |
| 10875 | 8791 | 15820 |

In order to normalize the time intervals for each of the sequences, the normalization factor for each sequence is obtained by calculating the average time interval for each sequence and, in certain embodiments, dividing by 128 (or other power of 2) for increased calculation efficiency. The following chart provides the normalization factor for each of the sequences:

| Stored | Faster | Incorrect |
|---|---|---|
| 85 | 70 | 93 |

The time interval data for each of the sequences is then divided by the respective normalization factor in order to create a semi-unique key for each sequence. Importantly, the average of a sequence is a consequence of the rhythm of the sequence and does not relate to the order of the taps. The following chart provides the normalized time interval data:

| Stored | Faster | Incorrect |
|---|---|---|
| 124 | 110 | 102 |
| 89 | 86 | 127 |
| 39 | 51 | 64 |
| 131 | 130 | 127 |
| 259 | 271 | 190 |
| 127 | 126 | 169 |

The tolerance value for the primary input sequence is calculated using three metrics—(A) number of time intervals, i.e., length; (B) maximum internal range; and (C) the second differential average. The second differential average is calculated by taking the difference between each element and its successor and then averaging the values. Generally, two sequences are determined to be “similar enough” based on a tolerance criterion that is calculated as a metric of sequence complexity. The tolerance value is then calculated using a linear model. The following chart provides the second differential values for the primary input sequence:

| Stored | Differential |
|---|---|
| 124 | 35 |
| 89 | 51 |
| 38 | 93 |
| 131 | 128 |
| 259 | 132 |
| 127 | |

Using the above data, the (A) length is equal to 6; (B) maximum internal range is equal to 221; and (C) second differential is 87. These values are then inputted into the following regression model to determine the tolerance value for the primary input sequence:

$$Tolerance=17.37+3.72*Length+0.16*Range-0.23*Differential$$

Using the regression model, a tolerance value of 55 is calculated.

The difference between the normalized time intervals for the primary input sequence and the secondary input sequence is then calculated, as shown below, and the range is determined.

| Faster | Incorrect |
|---|---|
| 14 | 21 |
| 2 | −38 |
| −12 | −26 |
| 2 | 4 |
| −13 | 68 |
| 2 | −42 |

The value of the secondary input sequence range is subsequently compared to the tolerance value, wherein the value of a secondary input sequence range being less than the tolerance value results in a matching sequence and user access to the enclosure in communication with the programmable locking system 10. In the example, the secondary input sequence range for the "Faster" sequence is 27 and for the "Incorrect" sequence is 110. Accordingly, access is permitted for the "Faster" sequence and denied for the "Incorrect" sequence.

Results of the above-referenced examples have demonstrated the unique ability of the method and system disclosed herein to detect rhythm for the purpose of selectively providing access to an enclosure.

Another embodiment of the method and system described herein includes masking for comparing secondary input sequences of differing tap length with the primary input sequence. For instance, a user who is inputting a secondary input sequence may mask their sequence within a larger sequence, and the system will still be able to detect whether a particular portion of the secondary input sequence matches the primary input sequence.

While the present invention has been shown and described in accordance with several preferred and practical embodiments, it is recognized that departures from the instant disclosure are contemplated within the spirit and scope of the present invention.

What is claimed is:

1. A method for detecting rhythm for selectively controlling access via a programmable locking system, said method including the steps of:

detecting a plurality of primary taps made by a user;

generating and storing the time intervals between each of said plurality of primary taps as a primary input sequence;

normalizing said primary input sequence;

calculating a tolerance value of said primary input sequence;

detecting a plurality of secondary taps made by a user;

generating and storing the time intervals between each of said detected plurality of secondary taps as a secondary input sequence;

normalizing said secondary input sequence;

generating and storing a plurality of difference values, wherein said plurality of difference values is equal to the value of the differences between the corresponding time intervals of said normalized primary and secondary input sequences;

generating and storing a secondary input sequence range, wherein said secondary input sequence range is equal to the value of the range between the minimum and maximum values of the stored plurality of difference values;

comparing the tolerance value of said primary input sequence to the value of the secondary input sequence range; and providing access via the programmable locking system when the value of said secondary input sequence range is lower than the tolerance value of said primary input sequence.

2. The method as recited in claim 1 wherein the step of normalizing said primary input sequence comprises dividing said primary input sequence by a factor of 128.

3. The method as recited in claim 1 wherein calculating the tolerance value of said primary input sequence comprises calculating using the equation, $$Tolerance=17.37+3.72*Length+0.16*Range-0.23*Differential.$$

4. The method as recited in claim 2 wherein the step of normalizing said secondary input sequence comprises dividing said primary input sequence by a factor of 128.

* * * * *